Patented Mar. 10, 1925.

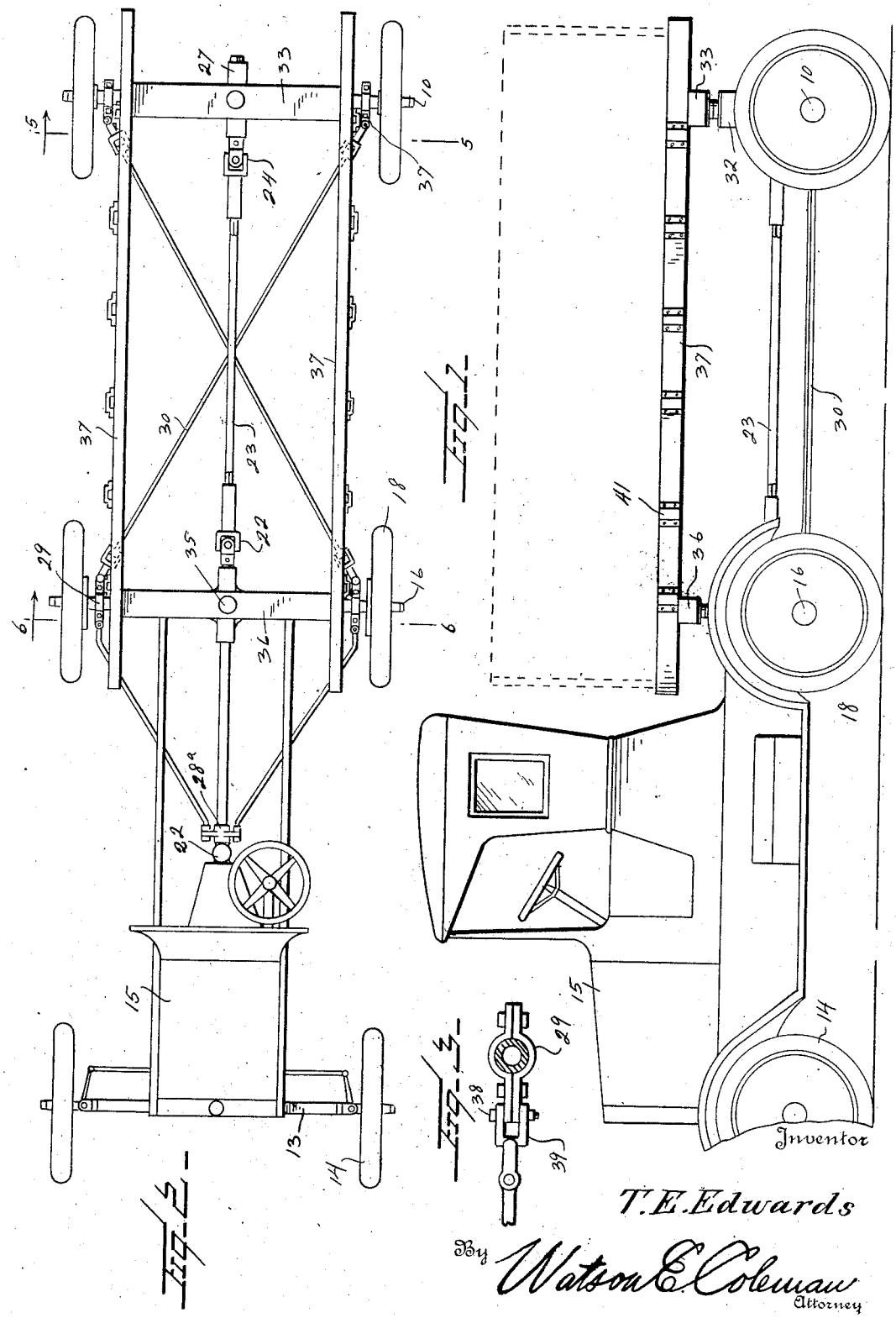

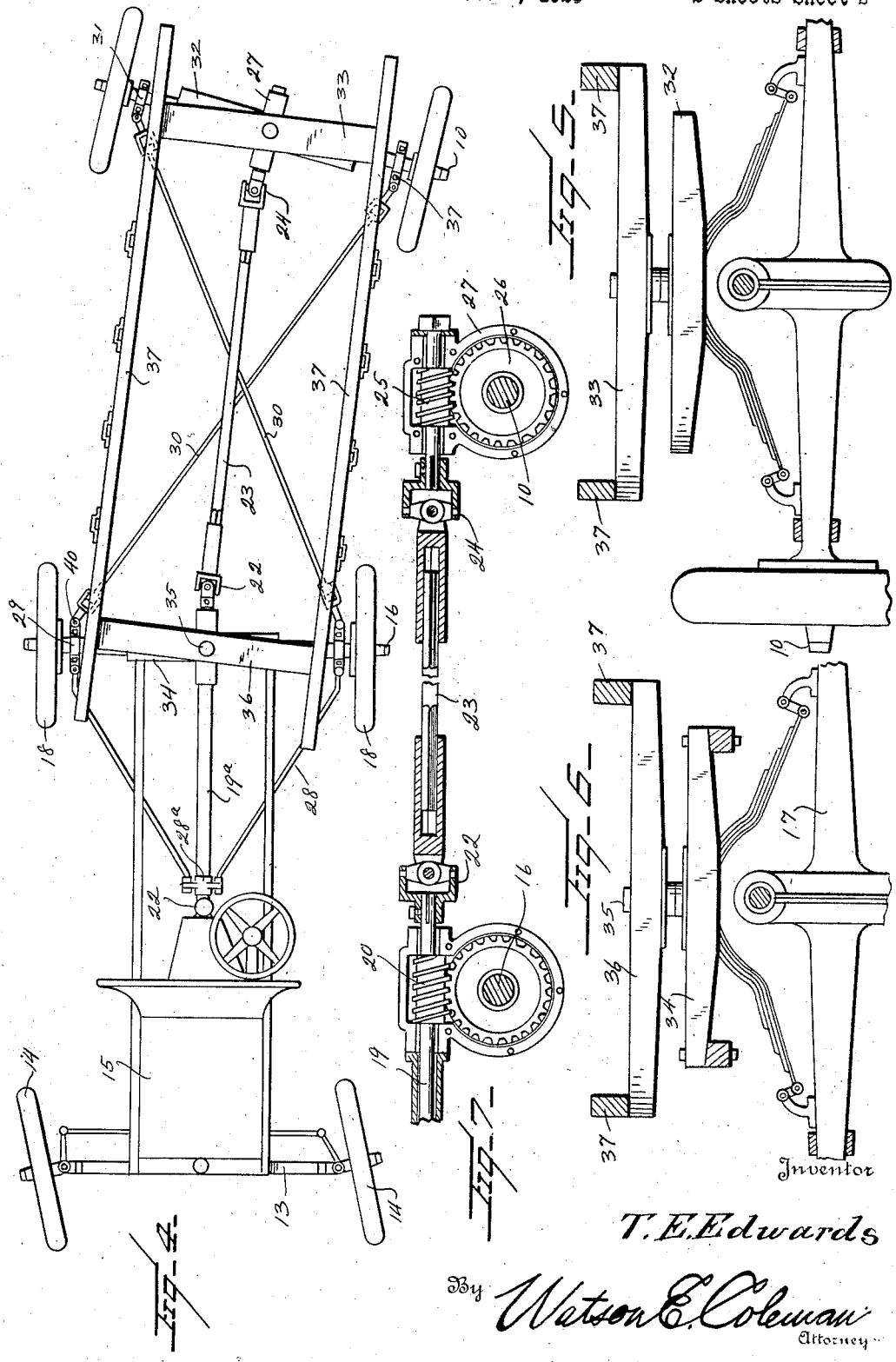

1,528,916

UNITED STATES PATENT OFFICE.

THOMAS E. EDWARDS, OF HAYESVILLE, NORTH CAROLINA.

MOTOR TRUCK.

Application filed February 5, 1923. Serial No. 617,034.

*To all whom it may concern:*

Be it known that I, THOMAS E. EDWARDS, a citizen of the United States, residing at Hayesville, in the county of Clay and State of North Carolina, have invented certain new and useful Improvements in Motor Trucks, of which the following is a specification, reference being had to the accompanying drawings.

This invention relates to the running gears of motor vehicles, and particularly to a running gear having provision for six supporting wheels, four of which constitute driving means and disposed rearward of the center of the vehicle.

One of the objects of this invention is to provide means whereby the axles of the driving wheels are caused to shift bodily during the movement of the vehicle along a curved path so that the driving wheels will properly and automatically track.

A further object is to provide a vehicle of this character in which the wheel base shall be relatively long.

A still further object is to provide a vehicle of this character so constructed that the forward end of the vehicle including the intermediate driving axle may be detached from the rear half of the vehicle or truck body and thus the forward half of the vehicle be used as a motor car for ordinary road work, the construction being such, of course, that the rear or truck portion of the vehicle may be readily detached from the forward portion so as to provide a truck having a four-wheel drive.

Other objects have to do with the details of construction and arrangement of parts as will appear more fully hereinafter.

My invention is illustrated in the accompanying drawings, wherein:—

Figure 1 is a side elevation of my improved motor vehicle, the body being shown in dotted lines;

Figure 2 is a top plan view of the chassis of the vehicle;

Figure 3 is a detail elevation of the clip for holding the radius rods to the axle housing;

Figure 4 is a top plan view of the vehicle as in Figure 2, but showing the position of the parts taken when the vehicle is turning;

Figure 5 is a section on the line 5—5 of Figure 2;

Figure 6 is a section on the line 6—6 of Figure 2;

Figure 7 is a longitudinal sectional view of the driving shafts, the forward and rear driving axles, and the forward and rear axle housings.

Referring to these drawings, 10 designates the rear axle, 11 the rear axle housing, and 12 the rear driving wheels. 13 designates the front axle and 14 the front steering wheels which are mounted in the usual knuckles and are shifted by the ordinary steering wheel. 15 designates the motor casing, 16 designates the intermediate driving axle and the housing 17 therefor, and 18 the intermediate wheels. From the motor extends the drive shaft 19, which shaft carries a worm 20 operatively engaging with a worm wheel forming part of the differential operatively connected to the transverse axle or shaft 16.

Rearward of the housing 21 within which this differential operates is a universal joint 22, and having sliding movement in this universal joint and rotatable therewith is a shaft section 23 which extends rearward to the rear axle housing where it slidingly connects with a universal joint 24 with which it has unitary rotation. This joint 24 in turn is connected to a worm shaft section 25 operating on a worm wheel 26 which forms part of the differential enclosed within the differential housing 27 forming part of the rear axle housing 11 and driving the shaft 10. The outer ends of the housing 17 are connected by converging radius rods 28 to a clip 28ª embracing the housing 19ª of the driving shaft 19, the rear ends of these rods being connected to clips 29 operatively connected to the housing 17. Pivoted to the clips 29 are radius rods 30 which extend across each other and are in turn hingedly or pivotally connected to the rear end of clips 31 attached to the rear axle housing. Thus it will be obvious that when the axle 17 turns relative to the chassis in one direction, the rear axle will be turned in the reverse direction.

Carried by springs upon the rear axle housing is a bolster 32, and pivotally supported upon this bolster 32 is a bolster 33 supporting the rear end of the body frame. Mounted by springs upon the axle housing 17 or forming part therewith is a bolster 34, and pivoted thereto by the king bolt 35 is the bolster 36 which is also operatively connected to the frame. This frame includes longitudinally extending beams 37 which extend forward to the forward end of the machine and are connected to the front axle in any suitable manner.

It will be seen that this construction is such that when the steering wheels are shifted to turn the vehicle, the axle housing 11 will shift laterally about its pivot, which is the king bolt 35 passing through the bolsters 23 and 24, until the axis of rotation of the shaft 17 will intersect the axis of rotation of the steering wheels 14 at a point which is the center of the circle traversed by the vehicle. This adjustment of the shafts 13 and 17 will be automatic, and obviously the axles will adjust themselves to cause the axes of all of the wheels to be disposed in radial lines extending from the center of the circle traversed by the vehicle.

Preferably the radius rods 30 are connected to the axle housing by stirrup hinges 39 of the same type as those used on the common spring hanger, the bifurcated arms of this stirrup being engaged with a clip 29 embracing the axle housing, as shown in Figure 3, the bifurcated arms being connected to the clip by means of a removable bolt 38.

It will be seen that my invention permits the lengthening of the load space of the vehicle and puts four wheels under the same load, making all four wheels tractive or drive wheels with an automatic steering of the two rear wheels so that they will follow or track the middle set, causing the entire running gear to be operated on the road or turned to the same degree as the common four-wheel running gear. The same principle can be applied to an automobile which is desired for long distance touring or carrying luggage.

Obviously I do not wish to restrict myself to any particular length of the vehicle, as it may be varied as needs may demand. Normally, however, this construction secures a wheel base of 120" from the middle axle to the rear axle, so that the vehicle has a road length of from 14 to 16' with only a relatively short extension over each axle. This makes it possible and practical to use motive power more successfully in almost all kinds of truckage. The running gear is relatively simple and economical, as there is only a very slight change over the ordinary and conventional type of truck and yet a great advantage will be secured over the ordinary truck running gear, and it is particularly advantageous for medium sized trucks.

It will be seen that there are only two real changes in my truck over the ordinary truck, that is the differential housings and the drive shaft. The differential housings are formed so that the drive shaft sections pass through the intermediate housing to the rear housing and a drive of all four wheels is thereby secured. The length of the wheel base and the hinging of the crossed radius rods and the use of the ordinary spring leaves permits each axle and wheel to move independently of any other axle or wheel in or out of holes or other sharp humps in the road without placing any extra strain on any other part of the truck.

It will be seen that the radius rods 30 at their forward ends are connected to the clip 29 embracing the forward axle housing by means of removable bolts 38, that the king bolt 35 is removable, and that the universal joint 22 is also held in place by a removable bolt, set screw or the like. Thus the truck or load body can be taken away from the front section of the machine, leaving the front section to be used as a car or simple roadster. On the other hand, when it is desired to haul goods to market or use the truck for any other purpose, the forward section of the vehicle is simply backed up to the attachment and the bolts and the king bolt replaced. Stake sockets or cuffs 41 will, of course, be applied to the body frame or longitudinal members 37 or any other suitable body may be applied thereto.

I have shown transverse springs supporting the bolsters 32 and 34 but where side springs are used they are attached to the axle housing in the same way as already in use on common trucks. Inasmuch as the spring system does not form part of this invention and is obvious, it is not believed it is necessary to illustrate all the spring systems which may be used. It will be seen that I have provided a vehicle which is separable into two parts so that one of the sections may form an ordinary roadster whenever desired and the other section may be readily attached to the forward section when necessary, and that I have provided a trucking vehicle having a four-wheel drive and the requisite flexibility to turn curves and that practically a Ford motor car may be used as the forward section of the vehicle with but slight alteration, that is merely extending the shaft 19 out of the housing for the rear axle and applying a universal joint thereto.

I claim:—

A motor vehicle comprising a front section and a rear section, the front section having front steering wheels, rear driving wheels and a driving shaft extending rearward beyond the rear driving wheels and the rear section having rear driving wheels, a transmission shaft operatively connected thereto and detachably connected with the driving shaft of the forward section, the rear section of the truck having a frame including a bolster, a king bolt whereby it may be detachably and pivotally supported upon the rear axle housing of the forward section, crossed radius rods extending beneath the frame of the rear section and having clips at their rear ends to which they are pivotally connected, these clips embracing the rear axle housing of the rear section, the forward end of the radius rods being pivotally and detachably connected to the rear ends of clips embracing the rear axle housing of the forward section of the automobile and forwardly converging radius rods having their rear ends secured to the forward ends of the last named clips and their forward ends secured to a housing enclosing said drive shaft.

In testimony whereof I hereunto affix my signature.

THOMAS E. EDWARDS.